S. C. LINBARGER.
REFRACTORY ARTICLE AND METHOD OF MAKING THE SAME.
APPLICATION FILED OCT. 31, 1918.
1,345,377. Patented July 6, 1920.
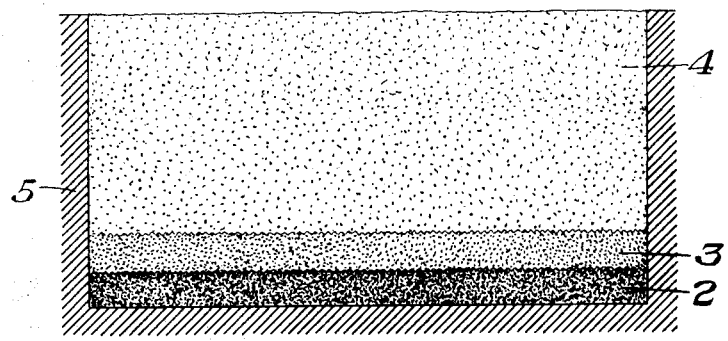
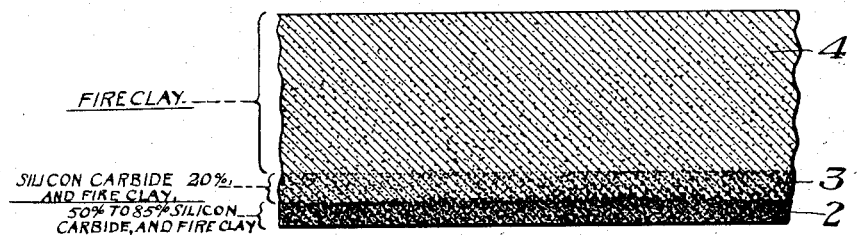
WITNESSES
R H Balderson
Jesse B. Heller
INVENTOR
S. C. Linbarger
by Bakewell, Byrnes & Carmills
Attys

UNITED STATES PATENT OFFICE.

SILAS C. LINBARGER, OF NIAGARA FALLS, NEW YORK, ASSIGNOR TO THE CARBORUNDUM COMPANY, OF NIAGARA FALLS, NEW YORK, A CORPORATION OF NEW YORK.

REFRACTORY ARTICLE AND METHOD OF MAKING THE SAME.

1,345,377.  Specification of Letters Patent.  Patented July 6, 1920.

Application filed October 31, 1918. Serial No. 260,449.

*To all whom it may concern:*

Be it known that I, SILAS C. LINBARGER, residing at Niagara Falls, in the county of Niagara and State of New York, have invented a new and useful Improvement in Refractory Articles and Methods of Making the Same, of which the following is a full, clear, and exact description, reference being had to the accompanying drawings, forming part of this specification, in which—

Figure 1 is a sectional view illustrating one step in the manufacture of my improved article;

Fig. 2 is a sectional view of a portion of the finished article.

My invention relates to refractory articles containing silicon carbid, and more especially to a composite article having one side or face consisting largely or wholly of silicon carbid with a body or backing in which fireclay or other refractory material predominates.

Refractory articles containing a considerable percentage of silicon carbid have proved of great value in many locations where they are exposed to high temperature conditions. They withstand intense heat and are neutral to the action of many chemical substances. They are, however, relatively more expensive than similar articles composed wholly of fireclay materials, and are much better conductors of heat. While the high thermal conductivity of silicon carbid is an advantage in certain refractory articles, such as retorts and muffles, it is a distinct disadvantage in the linings of certain furnaces, such, for instance, as the linings of boiler furnaces. For this purpose, it has been proposed to use ordinary firebricks which were faced with carborundum on the side exposed to the fire, and bricks have been made and used which consist of an ordinary fire brick having a coating of silicon carbid and a suitable binder on one side or face only about one-fourth of an inch in thickness. Such bricks have been satisfactory from a refractory point of view, but owing to the unequal expansion of the carborundum facing and the fireclay backing under heat, the coating is very apt to spall off and fall away. It has also been proposed to make firebrick in which a facing of silicon carbid about one inch in thickness was secured to the brick proper by a dove-tailed rib-and-groove-engagement. This is also satisfactory from a refractory point of view, but in use, especially in boiler furnaces, the silicon carbid pieces are apt to be fractured by the firemen and fall off.

My invention provides a firebrick or other refractory article comprising successive layers, one layer forming one face of the brick or other article containing sufficient silicon carbid to combine the best refractory and chemically resistent properties desired for the particular purpose in view. The successive layers contain progressively less silicon carbid and more fireclay, silica or other refractory material.

My invention can be used either with the dry-pressed process or the wet process of making firebrick. In either case, it is desirable to roughen up the surface of a preceding layer before applying the next layer, so as to cause the layers to be knitted together as closely as possible. For example, in making a dry pressed brick, the layer containing the higher or highest percentage of silicon carbid is first added in the bottom of the mold, struck off to make it substantially even in thickness, and then combed up in a manner to leave its surface rough and irregular. The next layer is then added and treated in the same manner. After the full amount of material has been placed in the mold, it is pressed, after which the layers will be found to have been closely knitted together.

The difference in the coefficient of expansion of the successive layers is relatively slight, and there is, therefore, little or no tendency for one layer to flake off from the next layer. Furthermore, owing to the comparatively little difference in the amount and character of the bonding material in the adjacent layers, a good ceramic union between the layers is formed. A further advantage of the invention is that a wall built up of brick of this character does not have a high thermal conductivity, since the bulk of the wall is composed of fireclay of low thermal conductivity.

Bricks of this character are of great utility when used in the linings of furnaces under boilers, kiln furnaces, brass-melting furnaces and in many other locations where a highly refractory furnace is desirable.

My invention is also applicable to many other refractory forms besides bricks. It may, for example, be used in the manufacture of bats or shelves employed in the placing of pottery in potters' kilns. For such purpose, I have found it advantageous to make the lower portion of the bat of a mixture containing from 50 to 85% silicon carbid, and the balance of fireclay. I then use an intermediate portion or layer consisting preferably of about 20% of silicon carbid and a final layer which consists of pure fireclay without any silicon carbid. Such bats or shelves are advantageous in the burning of certain classes of ceramic ware where silicon carbid has a certain reducing and discoloring action on the ware, since the portions of the refractories in contact with the ware are fireclay.

My invention may also be used in the manufacture of glass pots and the like, the outside portion being composed of a high silicon carbid mix, and the inner portions, which are subjected to the action of glass, containing either a small proportion of silicon carbid or none at all.

Many other applications of my invention will occur to those skilled in the art.

In Fig. 1 of my invention, I have illustrated the manner in which the successive layers of forming material 2, 3 and 4 may be placed in a suitable mold 5, the surface of each layer being roughened before applying the next layer. Fig. 2 illustrates a section of a finished article constructed in accordance with my invention. It will be noted that in the latter, the layers while firmly knit together are nevertheless preserved intact, so that each layer retains its initial characteristics with respect to the amount of silicon carbid it contains.

I do not limit myself to the employment of three layers, since a greater number may be employed, if desired, with a more gradual progressive change in the silicon carbid content.

I claim:

1. A refractory article having a body portion consisting substantially of fireclay, a facing portion containing a substantial portion of silicon carbid, and an intermediate portion containing silicon carbid in such decreasing amounts from the facing portion as will give a graduated and increasing coefficient of expansion from said facing portion to said body portion.

2. A refractory article, consisting of a plurality of layers united in a practically integral manner, one of the outer layers having fireclay as its predominating element, the opposite outer layer having silicon carbid as its predominant element and forming the facing portion of the article, the silicon carbid being proportioned in said layers in such decreasing amounts from the facing layer inward as will give a graduated and increasing coefficient of expansion from said facing portion inward.

3. The method of making refractory articles composed mainly of silicon carbid and refractory binding material, which consists in forming superimposed layers, one of which forms a facing layer, and proportioning the silicon carbid in such decreasing amounts from the facing portion inward as will give a graduated and increasing coefficient of expansion from said facing portion inward, and compressing said layers together into a unitary mass.

4. The method of forming refractory articles composed mainly of silicon carbid and a refractory bonding material, which consists in forming superimposed layers of the forming material in a suitable mold, the different layers having different predetermined proportions of silicon carbid and bonding material, shaping the adjoining surfaces of the different layers in a manner to cause them to unite together, and pressing the several layers into a unitary mass or body.

In testimony whereof I have hereunto set my hand.

SILAS C. LINBARGER.